(12) United States Patent
Hu et al.

(10) Patent No.: US 8,915,406 B2
(45) Date of Patent: Dec. 23, 2014

(54) DOSING UNIT FOR A POWDER DISPENSER

(75) Inventors: Ruguo Hu, Shanghai (CN); Rong Chen, Shanghai (CN); Smith Yang, Shanghai (CN)

(73) Assignee: Nestec S.A., Vevey (CH)

( * ) Notice: Subject to any disclaimer, the term of this patent is extended or adjusted under 35 U.S.C. 154(b) by 20 days.

(21) Appl. No.: 13/805,923

(22) PCT Filed: Jun. 6, 2011

(86) PCT No.: PCT/EP2011/059291
§ 371 (c)(1),
(2), (4) Date: Dec. 20, 2012

(87) PCT Pub. No.: WO2011/160938
PCT Pub. Date: Dec. 29, 2011

(65) Prior Publication Data
US 2013/0092711 A1  Apr. 18, 2013

(30) Foreign Application Priority Data
Jun. 24, 2010 (CN) .......................... 2010 1 0253787

(51) Int. Cl.
*B65D 83/06* (2006.01)
*G01F 11/46* (2006.01)
*G01F 11/24* (2006.01)
*A47J 31/40* (2006.01)
*G01F 11/44* (2006.01)

(52) U.S. Cl.
CPC ................ *B65D 83/06* (2013.01); *G01F 11/46* (2013.01); *G01F 11/24* (2013.01); *A47J 31/404* (2013.01); *G01F 11/44* (2013.01)

USPC ............... 222/428; 222/1; 222/452; 222/485; 222/486; 222/41; 222/271; 222/367; 222/370

(58) Field of Classification Search
CPC ....... B67D 7/166; G01F 11/24; A47J 31/404; F16K 3/06; F16K 3/08
USPC ......... 222/427–429, 452, 425, 426, 485, 486, 222/1, 41, 139, 142, 271–274, 367–370, 222/226, 236–242, 410; 251/304
See application file for complete search history.

(56) References Cited

U.S. PATENT DOCUMENTS

| | | | | |
|---|---|---|---|---|
| 945,796 | A | * | 1/1910 | Nicholas et al. ................. 222/38 |
| 1,109,134 | A | * | 9/1914 | Millard ......................... 221/203 |
| 1,338,429 | A | * | 4/1920 | Falkiner ........................ 222/429 |

(Continued)

FOREIGN PATENT DOCUMENTS

| | | |
|---|---|---|
| DE | 9416946 | 2/1995 |
| UA | 64768 | 11/2001 |

*Primary Examiner* — Kevin P Shaver
*Assistant Examiner* — Nicholas J Weiss
(74) *Attorney, Agent, or Firm* — K&L Gates LLP

(57) ABSTRACT

The invention concerns a dosing unit for a powder dispenser comprising two dosing chambers (2,3) each chamber comprising: one upstream inlet (21, 31) and one downstream outlet (22, 32), an upstream means (23, 33) for opening and closing the inlet, a downstream means (24, 34) for opening and closing the outlet, the upstream means (23, 33) closing the inlet (21, 31) when the downstream means (24, 34) opens the outlet (22, 32) and reciprocally, wherein the upstream means (23) of the first chamber closes the first chamber (2) when the upstream means (33) of the second chamber opens the second chamber (3) and reciprocally.

13 Claims, 3 Drawing Sheets

(56) References Cited

U.S. PATENT DOCUMENTS

| | | | |
|---|---|---|---|
| 1,593,308 A | * | 7/1926 | McCue .................... 222/133 |
| 2,190,111 A | * | 2/1940 | Zellers .................... 222/368 |
| 2,602,576 A | * | 7/1952 | Spruck ..................... 141/94 |
| 2,732,980 A | * | 1/1956 | Oholm ..................... 222/427 |
| 2,853,172 A | * | 9/1958 | Angell ..................... 194/350 |
| 3,478,936 A | * | 11/1969 | Farmery .................. 222/340 |
| 4,053,087 A | | 10/1977 | Lack et al. |
| 4,473,175 A | * | 9/1984 | Zengaffinen et al. ....... 222/452 |
| 5,213,450 A | * | 5/1993 | Bercx ..................... 406/128 |
| 5,405,061 A | | 4/1995 | Kuegler |
| 7,703,639 B2 | * | 4/2010 | Landau et al. .............. 222/1 |

\* cited by examiner

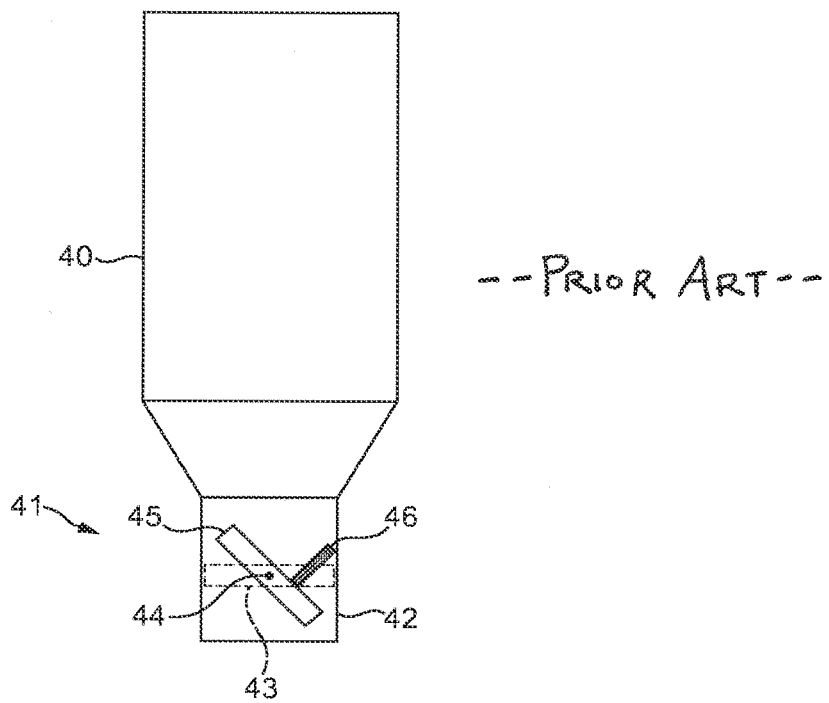
FIG. 1a —PRIOR ART—
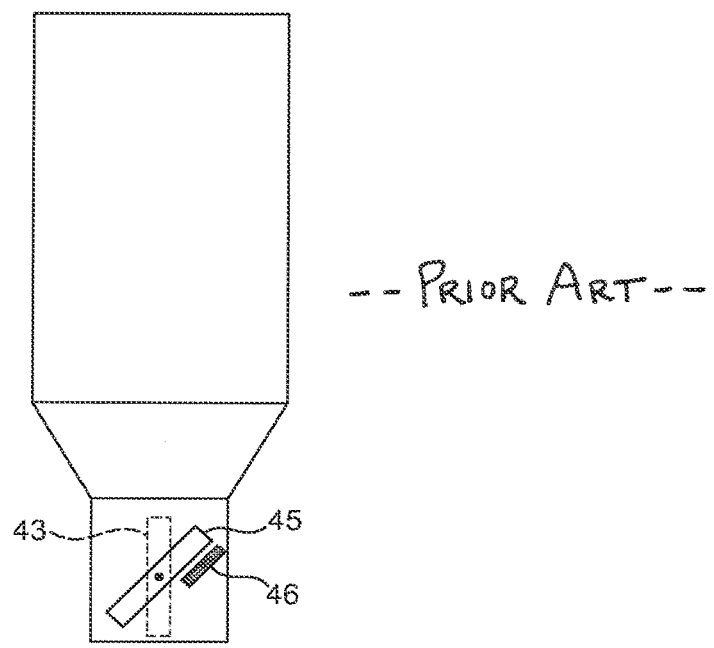
FIG. 1b —PRIOR ART—

DOSING UNIT FOR A POWDER DISPENSER

CROSS REFERENCE TO RELATED APPLICATIONS

The present application is a National Stage of International Application No. PCT/EP2011/059291, filed on Jun. 6, 2011, which claims priority to Chinese Patent Application No. 201010253787.4, filed on Jun. 24, 2010, the entire contents of which are being incorporated herein by reference.

The present invention relates to a dispenser for distributing pre-set quantities of powder, preferably of beverage or food ingredient powders.

A powder dispenser usually comprises a powder tank closed at its bottom by a dosing device for dosing and pouring a dose of powder in a receptacle. For the simplest dispensers that are actuated manually, the dosing device usually consists in a horizontal plate obstructing the bottom of the tank and that is rotated to become vertical and let the powder flow from the tank. This rotation is implemented by manually rotating an actuator along a 90° angle. Depending on the nature of the powder stored in the tank, specific instructions are set to get the correct dose of powder for preparing the beverage or the food from the powder ingredient. These instructions correspond to the number of partial rotations that must be applied to the actuator. One rotation corresponds to the dosing of a specific pre-set volume of powder and is actuated manually by a partial rotation of an actuator in one sense. A spring generally pushes the actuator back to avoid a too long opening of the tank and an inaccurate dosing. The dispenser usually comprises several tanks for delivering different powders for example for producing different beverages like coffee, chocolate, soups, . . . . All the tanks are linked to the same type of dosing device so that the operator can refill the tank with whatever food ingredient powder, the dosing unit delivering always the same volume of powder each time it is actuated.

Depending of the beverage to be prepared, the customer may need either an important volume of powder or a small volume of powder. Actually a beverage like a chocolate or a cappuccino may require 15 to 30 g of powder whereas a coffee may require only 2 g. Then for some beverage requiring an important volume of powder, the customer must actuate the powder dosing device several times to get the right dose for example 7-10 times. In view of such a large number, during the operation, the customer can forget the number of rotations that he still has to make and not get the correct final dose powder for preparing the food or the beverage.

Moreover, this operation can be tiring if it is the same operator who actuates the dispenser for every dosing: he must actually alternatively rotate the actuator in one sense and then in the other sense a huge number of times. This movement is not ergonomic.

One aim of the present invention is to solve these problems and to propose a powder dispenser that can be manually operated and that is able to dispense big doses of powders without tiring the operator.

Another aim of the present invention is to propose a powder dispenser that can be manually operated in an intensive manner without tiring the operator.

Another aim of the present invention is to propose a powder dispenser that can be manually operated without error in the dose to be dispensed.

According to a first aspect, the invention concerns a dosing unit for a powder dispenser comprising two dosing chambers, each chamber comprising:
one upstream inlet and one downstream outlet,
an upstream means for opening and closing the inlet,
a downstream means for opening and closing the outlet, the upstream means closing the inlet when the downstream means opens the outlet and reciprocally,
wherein the upstream means of the first chamber closes the first chamber inlet when the upstream means of the second chamber opens the second chamber inlet and reciprocally.

The dosing unit of the present invention comprises two dosing chambers. Each of these two chambers usually presents the same internal volume. This volume corresponds to the smallest volume that can be delivered by the dosing unit. Each chamber comprises an inlet for the introduction of the powder to be dosed and an outlet for the evacuation of the dosed powder, the powder flowing in and out of the chamber by gravity.

In the present description the terms "upstream" and "downstream" and equivalents are used to describe the relational positioning of features of the invention. They should be understood to refer to the dosing unit in its normal orientation in the powder dispenser as shown, for example, in FIG. 2 the powder falling in and out of the chamber by gravity.

Each chamber comprises means for alternatively opening and closing the upstream inlet and means for simultaneously alternatively closing and opening the downstream outlet. The dosing unit is configured so that for each chamber the upstream means closes the inlet when the downstream means opens the outlet and reciprocally. Due to this configuration, each chamber can be either opened at its upstream inlet and closed at its downstream outlet which corresponds to a position for charging and dosing the powder in the chamber, or closed at its upstream inlet and opened at its downstream outlet which corresponds to a position for discharging the powder from the chamber.

Moreover the dosing unit is configured so that the upstream means of the first chamber closes the first chamber when the upstream means of the second chamber opens the second chamber and reciprocally. Due to this configuration, the first chamber is in position for charging and dosing the powder when the second chamber is in position for discharging the powder and reciprocally.

The means for opening and closing the inlets and the outlets of the chambers can be blades—preferably rotary blades—that can present the same shape as the sections of the chambers at their inlets and outlets.

According to a preferred embodiment the two chambers can be joined by side. The two dosing chambers can present a semi cylindrical shape. They can be conjointly integrated in a tube.

According to another preferred embodiment the upstream blades can be driven by the same shaft. In this embodiment the upstream blades can be fixed to their common shaft according to a 90° angle difference. Accordingly the upstream blade of one chamber can be horizontally oriented while the upstream blade of the other chamber is vertically oriented.

According to another preferred embodiment the downstream blades can be driven by the same shaft. In this embodiment the downstream blades can be fixed to their common shaft according to a 90° angle difference. Accordingly the downstream blade of one chamber can be horizontally oriented while the downstream blade of the other chamber is vertically oriented.

According to these preferred embodiments the shafts of the upstream blades and the downstream blades can be connected through notched gears. The notched gears are inserted one in the other so that so that the upstream means of the first chamber closes the first chamber inlet when the downstream means of the first chamber opens the first chamber outlet and reciprocally. Accordingly the upstream blade of the first chamber can be horizontally oriented and its downstream blade vertically oriented while the upstream blade of the other chamber can be vertically oriented and its downstream blade horizontally oriented.

Preferably the dosing unit comprises a manual actuator for example on one of the shafts. The manual actuator can be a handle.

According to the preferred embodiments the dosing unit can comprise means for counting the doses delivered by the chambers. These means can comprise a ball hold between a spring and the disc surface of one of the notched gears and said notched gear can present at least one hole, preferably four holes regularly angularly spaced on its disc surface and able to face the ball during the notched gear rotation.

According to a second aspect the present invention concerns a powder dispenser comprising an assembly of a dosing unit such as defined above and a powder tank connected to the chambers inlets. The dispenser can comprise several assemblies such as defined above wherein the tanks store different food or beverage powder ingredients. The beverage powder ingredients can be selected in the list of soup powder, mashed potato powders, chocolate powder, coffee powder, cappuccino powder, . . . .

According to a third aspect the present invention concerns a method for dispensing a dose of powder comprising the steps of:
  providing a powder dispenser such as defined above,
  rotating the shafts until the required dose of powder is delivered.

BRIEF DESCRIPTION OF THE DRAWINGS

The characteristics and advantages of the invention will be better understood in relation to:
FIGS. 1a and 1b which are schematic front view of a dosing unit of the state of the art.

DETAILED DESCRIPTION OF THE DRAWINGS

Figure 2:
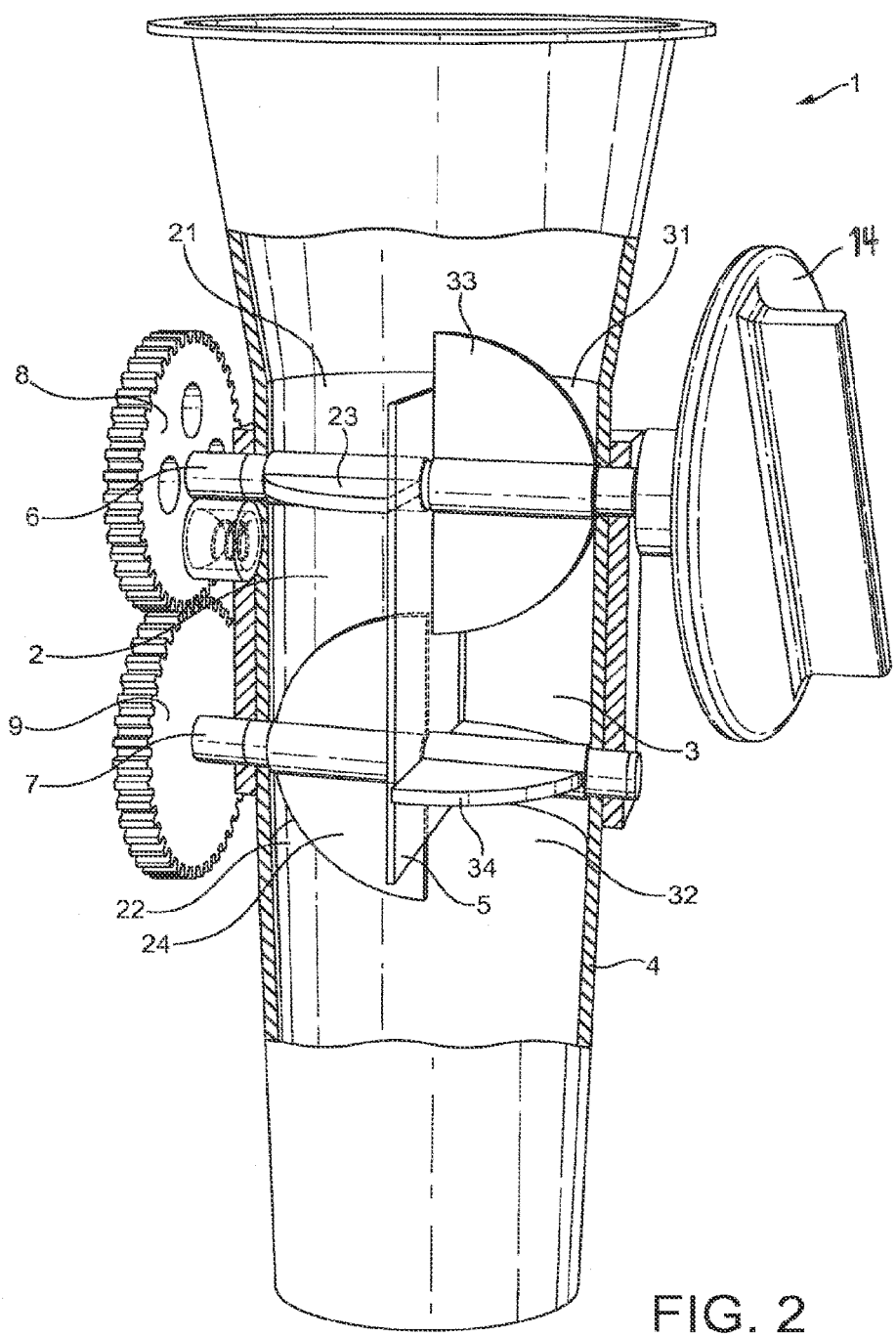
FIG. 2 which depicts a perspective view of the dosing unit of the present invention.

FIGS. 1a and 1b illustrate the way to dispense a dose of powder with a dispenser of the state of the art. This dispenser comprises a tank 40 for storing the powder and a dosing unit 41. The dosing unit consists in a tube 42 in which a plate 43 (represented in dotted lines) is placed so as to either close or open the tube section. This plate 43 is fixed on a shaft 44 and the shaft is linked to a manual actuator 45. When the dosing unit is not used, the actuator is at rest according to FIG. 1a and orientates the plate 43 horizontally. Then no powder is dosed. When a dose of powder must be delivered, the actuator is turned clockwise according to a 90° angle so that the plate is placed vertically and the powder can flow through the tube 42. Stopping means 46 are placed so that the actuator can move not more than 90°.

This dispenser presents several drawbacks:
  for the dispensing of a big amount of powder the operator using this dispenser must turn the actuator 46 clockwise and then counter clockwise a high number of times, which can lead to mistakes and which is tiring,
  with time depending on the force of the operator the actuator or the stopping means can be a abraded and even broken,
  the dosing is not accurate depending on the rapidity of the operator to turn the actuator.

FIG. 2 illustrates a dosing unit 1 according to the invention in which the walls of the two chambers 2, 3 have been made transparent. The chambers are defined by the division of a tube 4 by a vertical plate 5 in two half pipes forming the two chambers 2, 3. Preferably the two chambers present the same volume.

The first chamber 2 presents an upstream inlet 21 and a downstream outlet 22. The upstream inlet 21 can be opened and closed by closing and opening means 23, for example a blade 23 presenting the shape of the section of the chamber at its inlet and fixed on a first shaft 6. The rotation of the shaft 6 enables the rotation of the blade 23 for closing and opening the inlet 21 of the chamber depending on the respective horizontal or vertical orientation of the blade 23.

The second chamber 3 presents an upstream inlet 31 and a downstream outlet 32. The upstream inlet 31 can be opened and closed by closing and opening means 33, for example a blade 33 presenting the shape of the section of the chamber at its inlet and fixed on the same shaft 6. The rotation of the shaft 6 enables the rotation of the blade 33 for closing and opening the inlet 31 of the chamber depending on the respective horizontal or vertical orientation of the blade 33.

The upstream closing and opening means 23, 33 of the chambers 2, 3 are configured so that the upstream closing and opening means 23 of the first chamber closes the first chamber 2 when the upstream closing and opening means 33 of the second chamber opens the second chamber 3 and reciprocally. In the present illustrated embodiment the blades 23, 33 are fixed to their common shaft 6 according to a 90° angle difference.

In the same way the downstream outlet 22 of the first chamber can be opened and closed by closing and opening means 24, for example a blade presenting the shape of the section of the chamber at its outlet fixed on a second shaft 7. The rotation of the second shaft 7 enables the rotation of the blade 24 for closing and opening the outlet 22 of the chamber depending on the respective horizontal or vertical orientation of the blade 24.

The downstream outlet 32 of the second chamber can be opened and closed by closing and opening means 34, for example a blade presenting the shape of the section of the chamber at its outlet and fixed on the second shaft 7. The rotation of the second shaft 7 enables the rotation of the blade 34 for closing and opening the outlet 32 of the chamber depending on the respective horizontal or vertical orientation of the blade 34.

The downstream closing and opening means 24, 34 of the chambers 2, 3 are configured so that the downstream closing and opening means 24 of the first chamber closes the first chamber 2 when the downstream closing and opening means 34 of the second chamber opens the second chamber 3 and reciprocally. In the present illustrated embodiment the blades 24, 34 are fixed to their common shaft 7 according to a 90° angle difference.

The two shafts 6, 7 supporting the opening and closing means 23, 33, 24, 34 of the upstream inlets 21, 31 and downstream outlets 22, 32 are configured so that for each chamber the upstream blade 23, 33 closes the inlet 21, 31 when the downstream means 24, 34 opens the outlet 22, 32 and reciprocally. In the present embodiment, each shaft 6, 7 presents at its extremity a notched gear 8, 9 and the both gears are connected one to the other so that for each chamber the upstream blade 23, 33 closes the inlet 21, 31 when the downstream blade 24, 34 opens the outlet 22, 32 and reciprocally.

An actuator 14 is fixed at an extremity of the first shaft 6 to rotate the shaft 6 and indirectly the second shaft 7 and the four blades 23, 33, 24, 34. Any type of manual actuator can be used like a disc with prehensible means.

In the position illustrated in FIG. 2, the upstream blade 23 of the first chamber is horizontally oriented and the downstream blade 24 of the first chamber is vertically oriented which means that this chamber 2 is dispensing the dose of powder dosed in the first chamber while the upstream blade 33 of the second chamber is vertically oriented and the downstream blade 34 of the second chamber is horizontally oriented which means that this chamber 3 is dosing a dose of powder. When the actuator is rotated according to the clockwise rotation, the upstream blade 23 moves vertically in the first chamber 2 and opens the chamber inlet 21 while the downstream blade 24 moves horizontally and closes the chamber outlet 22. Simultaneously, the upstream blade 33 moves horizontally in the second chamber 3 and closes the chamber inlet 31 while the downstream blade 34 moves vertically and opens the chamber outlet 32. Consequently continuous rotation of the shafts 6, 7 creates continuous dosing of a dose of powder inside one chamber and discharging of a dose of powder from the other chamber.

Figure 3:
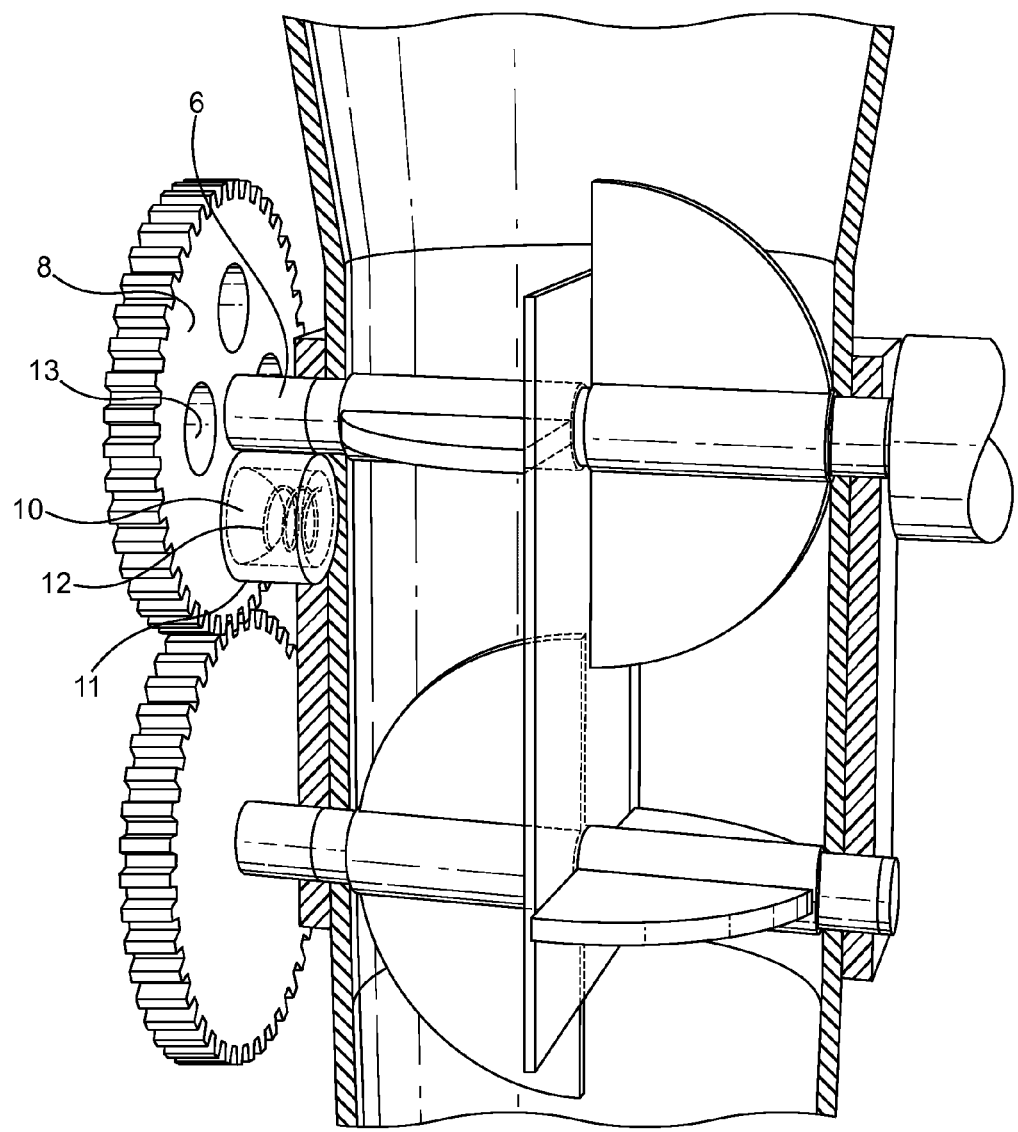
FIG. 3 which is a magnified view of the counting means of the dosing unit of FIG. 2.

The dosing unit can also comprise means for counting the doses delivered by the chambers. In the dosing unit illustrated in FIG. 3 the counting means counts each 90° rotation of the shaft or the actuator. FIG. 3 is a magnified view of the counting means of FIG. 2. The counting means comprises a ball 10 hold between a spring 12 and the disc surface of the notched gear 8 attached to the first shaft 6. This notched gear 8 presents four holes 13 regularly angularly spaced on its disc surface and able to face the ball 10 during the notched gear rotation. A hollow cylinder 11 (transparent in FIG. 3) holds the spring and the ball in front of the disc surface of the notched gear 8. When the notched gear 8 rotates and one of its holes 13 faces the cylinder 11, the spring 12 partially pushes the ball 12 in the hole 13. The hole 13 is sufficiently small so as to let only a part of the ball 10 emerges in the hole 13 so that the further rotation of the notched gear 8 pushes the ball 10 back against the spring 12. Consequently the operator actuating the dosing unit can feel the movement of the ball each time it faces a hole 13 in the notched gear 8 that is each time a 90° rotation of the shaft is realised that is each time a dose is delivered by one of the chambers 2, 3. Consequently the operator can easily count the number of delivered doses while continuously rotating the actuator in the same sense.

One advantage of the dosing unit of the present invention is that it enables the dosing and delivery of an important amount of powder without having to turn the actuator a high number of turns. One complete rotation of the actuator is sufficient to deliver four basic doses of powder.

Another advantage of the dosing unit of the present invention is that it enables the rotation of the actuator either clockwise or counter clockwise depending on the preference of the operator. This continuous sense of rotation associated to the counting means helps the operator in delivering the right dose of product whereas in the prior art the alternative rotation in one sense and in another sense leads to error of dosing.

Contrary to the dispenser of the prior art, the actuator can continuously turns in one sense or the other without meeting stopping means that could be abraded or broken.

The invention claimed is:

1. A dosing unit for a powder dispenser comprising:
   a first dosing chamber and a second dosing chamber that are two half-pipes formed by division of a tube by a vertical plate, each chamber comprising:
   one upstream inlet and one downstream outlet;
   an upstream blade fixed on a first shaft, the upstream blade having a shape that is complementary to at least a portion of the inlet for opening and closing the inlet;
   a downstream blade fixed on a second shaft, the downstream blade having a shape that is complementary to at least a portion of the outlet for opening and closing the outlet, wherein the shafts of the upstream blades and the downstream blades are connected through notched gears; and
   a ball held between a spring and a disc surface of one of the notched gears,
   the upstream blade closing the inlet when the downstream blade opens the outlet, and the upstream blade opening the inlet when the downstream blade closes the outlet,
   wherein the upstream blade of the first dosing chamber closes the first dosing chamber inlet when the upstream blade of the second dosing chamber opens the second chamber inlet, and the upstream blade of the first dosing chamber opens the first chamber inlet when the upstream blade of the second dosing chamber closes the second chamber inlet, and
   wherein the upstream blades are driven by the same shaft, and wherein the downstream blades are driven by the same shaft.

2. The dosing unit according to claim 1, wherein the chambers are joined at their sides.

3. The dosing unit according to claim 1 comprising a manual actuator.

4. The dosing unit according to claim 1 comprising a counter for counting the doses delivered by the chambers.

5. The dosing unit according to claim 1, wherein the two dosing chambers have a semi cylindrical shape.

6. A powder dispenser comprising:
   (i) at least an assembly of a dosing unit comprising a first dosing chamber and a second dosing chamber that are two half-pipes formed by division of a tube by a vertical plate, each chamber comprising:
   one upstream inlet and one downstream outlet,
   an upstream blade fixed on a first shaft, the upstream blade having a shape that is complementary to at least a portion of the inlet for opening and closing the inlet,
   a downstream blade fixed on a second shaft, the downstream blade having a shape that is complementary to at least a portion of the outlet for opening and closing the outlet,
   the upstream blade closing the inlet when the downstream blade opens the outlet, and the upstream blade opening the inlet when the downstream blade closes the outlet, and
   wherein the upstream blade of the first chamber closes the first chamber inlet when the upstream blade of the second chamber opens the second chamber inlet, and the upstream blade of the first chamber opens the first chamber inlet when the upstream blade of the second chamber closes the second chamber inlet; and
   (ii) a powder tank connected to the chamber inlets.

7. A method for dispensing a dose of powder comprising the steps of:
   providing a powder dispenser comprising at least an assembly of a dosing unit comprising two dosing chambers that are two half-pipes formed by division of a tube by a vertical plate, each chamber comprising one upstream inlet and one downstream outlet, an upstream blade fixed on a first shaft, the upstream blade having a shape that is complementary to at least a portion of the inlet for opening and closing the inlet, a downstream blade fixed on a second shaft, the downstream blade having a shape that is complementary to at least a portion of the outlet for opening and closing the outlet, the upstream blade closing the inlet when the downstream blade opens the outlet, and the upstream blade opening the inlet when the downstream blade closes the outlet, and wherein the upstream blade of the first dosing chamber closes the first chamber inlet when the upstream blade of the second dosing chamber opens the second chamber inlet, and the upstream blade of the first dosing chamber opens the first chamber inlet when the upstream blade of the second dosing chamber closes the second chamber inlet, the powder dispenser further comprising a powder tank connected to the chamber inlets; and rotating the shafts until the required dose of powder is delivered.

8. The dosing unit according to claim 1, wherein the upstream blade of the first dosing chamber is fixed to the first shaft at a 90 degree angle relative to the upstream blade of the second dosing chamber.

9. The dosing unit according to claim 1, wherein the downstream blade of the first dosing chamber is fixed to the second shaft at a 90 degree angle relative to the downstream blade of the second dosing chamber.

10. The dosing unit according to claim 1, wherein the upstream blade of the first dosing chamber is fixed to the first shaft at a 90 degree angle relative to the upstream blade of the second dosing chamber, the downstream blade of the first dosing chamber is fixed to the second shaft at a 90 degree angle relative to the downstream blade of the second dosing chamber, the upstream blade of the first dosing chamber is fixed to the first shaft at a 90 degree angle relative to the downstream blade of the first dosing chamber, and the upstream blade of the second dosing chamber is fixed to the first shaft at a 90 degree angle relative to the downstream blade of the second dosing chamber.

11. The dosing unit according to claim 1, comprising a hollow cylinder holding the spring and the ball in front of the disc surface.

12. The dosing unit according to claim 1, comprising holes in the disc surface that are spaced at equal angles from each other and face the ball during rotation of the corresponding notched gear.

13. The dosing unit according to claim 12, wherein the spring biases the ball against the disc surface such that alignment of one of the holes with the ball partially pushes the ball in the hole by force from the spring and continued rotation of the corresponding notched gear pushes the ball back against the spring by removing the alignment of the one of the holes with the ball.

* * * * *